United States Patent
Hansson (10) Patent No.: US 11,010,297 B2
(45) Date of Patent: May 18, 2021

(54) MEMORY UNIT AND METHOD OF OPERATION OF A MEMORY UNIT TO HANDLE OPERATION REQUESTS

(71) Applicant: ARM LIMITED, Cambridge (GB)

(72) Inventor: Andreas Hansson, Cambridge (GB)

(73) Assignee: ARM Limited, Cambridge (GB)

( * ) Notice: Subject to any disclaimer, the term of this patent is extended or adjusted under 35 U.S.C. 154(b) by 12 days.

(21) Appl. No.: 16/321,057

(22) PCT Filed: Jun. 26, 2017

(86) PCT No.: PCT/GB2017/051861
§ 371 (c)(1),
(2) Date: Jan. 28, 2019

(87) PCT Pub. No.: WO2018/033694
PCT Pub. Date: Feb. 22, 2018

(65) Prior Publication Data
US 2019/0163631 A1 May 30, 2019

(30) Foreign Application Priority Data

Aug. 19, 2016 (GB) ..................................... 1614195

(51) Int. Cl.
*G06F 12/0811* (2016.01)
*G06F 12/084* (2016.01)
(Continued)

(52) U.S. Cl.
CPC ........ *G06F 12/0811* (2013.01); *G06F 9/3881* (2013.01); *G06F 12/084* (2013.01);
(Continued)

(58) Field of Classification Search
CPC .............. G06F 1/00–3296; G06F 3/00; G06F 3/06–0689; G06F 5/00–16;
(Continued)

(56) References Cited

U.S. PATENT DOCUMENTS 6,578,110 B1 6/2003 Ohba
6,687,789 B1 * 2/2004 Keller ................. G06F 12/0864
711/128
(Continued)

FOREIGN PATENT DOCUMENTS

WO 2010/141223 12/2010

OTHER PUBLICATIONS

M. Gao, G. Ayers and C. Kozyrakis, "Practical Near-Data Processing for In-Memory Analytics Frameworks," 2015 International Conference on Parallel Architecture and Compilation (PACT), San Francisco, CA, 2015, pp. 113-124, doi: 10.1109/PACT.2015.22. (Year: 2015).*

(Continued)

*Primary Examiner* — Daniel C. Chappell
(74) *Attorney, Agent, or Firm* — Nixon & Vanderhye P.C.

(57) ABSTRACT

A memory unit includes a data storage to store data, an operation controller to receive operation requests issued by an upstream source, a downstream capabilities storage to store an indication of operations performable by at least one downstream memory unit, and processing circuitry to perform operations on data stored in the data storage under control of the operation controller. When an operation request to perform an operation on target data is received from the upstream request source, the operation controller is arranged to determine when to control the processing circuitry to perform the operation, and when to forward the operation to a downstream memory unit in dependence on whether the target data is stored in the data storage unit and the indication of operations performable by at least one downstream memory unit. This allows for operations to be executed at a suitable location within a memory system, taking into account not only where the data resides, but also the complexity of the operation and the capabilities of the (Continued)

processing circuitry provided at various memory locations within the memory system.

17 Claims, 9 Drawing Sheets

(51) Int. Cl.
  *G06F 12/0893* (2016.01)
  *G06F 15/78* (2006.01)
  *G06F 9/38* (2018.01)
(52) U.S. Cl.
  CPC ...... *G06F 12/0893* (2013.01); *G06F 15/7821* (2013.01); *G06F 2212/1056* (2013.01)
(58) Field of Classification Search
  CPC .......... G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2003/0691–0698; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G11C 11/00–5692; G11C 13/00–06; G11C 14/00–009; G11C 15/00–06; G11C 16/00–3495; G11C 17/00–18; G11C 2216/00–30
  See application file for complete search history.

(56) References Cited

U.S. PATENT DOCUMENTS

| | | | | |
|---|---|---|---|---|
| 7,406,573 | B2* | 7/2008 | Huppenthal | G06F 15/7867 326/41 |
| 8,996,951 | B2* | 3/2015 | Hyde | G06F 11/0793 714/763 |
| 9,977,609 | B2* | 5/2018 | Jayasena | G06F 12/084 |
| 9,996,479 | B2* | 6/2018 | Lea | G06F 12/1408 |
| 10,282,309 | B2* | 5/2019 | Jayasena | G06F 12/1009 |
| 10,445,094 | B2* | 10/2019 | Beard | G06F 12/0893 |
| 10,545,860 | B2* | 1/2020 | Malladi | G06F 12/023 |
| 10,552,152 | B2* | 2/2020 | Beard | G06F 12/084 |
| 10,795,815 | B2* | 10/2020 | Beard | G06F 12/0815 |
| 2005/0273649 | A1* | 12/2005 | Jung | G06F 13/124 714/5.11 |
| 2008/0147932 | A1* | 6/2008 | Fukazawa | G06F 11/2089 710/74 |
| 2011/0126066 | A1* | 5/2011 | Jo | G06F 13/1668 714/746 |
| 2012/0054452 | A1 | 3/2012 | Kumar et al. | |
| 2012/0324171 | A1* | 12/2012 | Benhase | G06F 12/0866 711/136 |
| 2013/0275631 | A1* | 10/2013 | Magro | G06F 13/28 710/28 |
| 2014/0136754 | A1* | 5/2014 | Hyde | G06F 11/34 711/103 |
| 2014/0136903 | A1* | 5/2014 | Hyde | G11C 29/886 714/47.3 |
| 2014/0208041 | A1* | 7/2014 | Hyde | G06F 13/16 711/146 |
| 2015/0106574 | A1* | 4/2015 | Jayasena | G06F 9/3881 711/154 |
| 2016/0028544 | A1* | 1/2016 | Hyde | G06F 3/0637 380/44 |
| 2017/0263306 | A1* | 9/2017 | Murphy | G11C 11/4076 |

OTHER PUBLICATIONS

M. Gokhale, B. Holmes and K. Iobst, "Processing in memory: the Terasys massively parallel PIM array," in Computer, vol. 28, No. 4, pp. 23-31, Apr. 1995, doi: 10.1109/2.375174. (Year: 1995).*
D. Kim, M. Chaudhuri, M. Heinrich and E. Speight, "Architectural support for uniprocessor and multiprocessor active memory systems," in IEEE Transactions on Computers, vol. 53, No. 3, pp. 288-307, Mar. 2004, doi: 10.1109/TC.2004.1261836. (Year: 2004).*
M. Kang and N. R. Shanbhag, "In-Memory Computing Architectures for Sparse Distributed Memory," in IEEE Transactions on Biomedical Circuits and Systems, vol. 10, No. 4, pp. 855-863, Aug. 2016, doi: 10.1109/TBCAS.2016.2545402. (Year: 2016).*
S. Li, D. Niu, K. T. Malladi, H. Zheng, B. Brennan and Y. Xie, "DRISA: A DRAM-based Reconfigurable In-Situ Accelerator," 2017 50th Annual IEEE/ACM International Symposium on Microarchitecture (Micro), Boston, MA, USA, 2017, pp. 288-301. (Year: 2017).*
Liu and Jino, "Intelligent Magnetic Bubble Memories and Their Applications in Data Base Management Systems," in IEEE Transactions on Computers, vol. C-28, No. 12, pp. 888-906, Dec. 1979, doi: 10.1109/TC.1979.1675279. (Year: 1979).*
Examination Report for GB Application No. 1614195.4 dated Sep. 30, 2019, 3 pages.
International Search Report and Written Opinion of the ISA for PCT/GB2017/051861 dated Sep. 7, 2017, 15 pages.
Combined Search and Examination Report for GB1614195.4 dated Feb. 3, 2017, 5 pages.
Gao et al., "Practical Near-Data Processing for In-Memory Analytics Frameworks", Proceedings of the 22$^{nd}$ International Conference on Parallel Architectures and Compilation Techniques, Oct. 18, 2015, pp. 113-124.
Kim et al., "Architectural support for uniprocessor and multiprocessor active memory systems", IEEE Transactions on Computers, vol. 53, No. 3, Mar. 1, 2004, pp. 288-307.
Draper et al., "The architecture of the DIVA processing-in-memory chip", Conference Proceedings of the 2002 International Conference on Supercomputing, Jun. 22, 2002, pp. 14-25.
Ahn et al., "PIM-Enabled Instructions: A Low Overhead, Locality-Aware Processing-in-Memory Architecture", ISCA'15, Jun. 13-17, 2015, 13 pages.
Loh et al., "A Processing-in-Memory Taxonomy and a Case for Studying Fixed-function PIM", AMD Research—Advanced Micro Devices, Inc., Dec. 2013, 4 pages.

\* cited by examiner

DOWNSTREAM CAPABILITY
REGISTER

| Boolean | Integer | Integer SIMD | Floating Point | Floating Point SIMD |
|---|---|---|---|---|
| 1 | 1 | 1 | 0 | 0 |

MEMORY UNIT AND METHOD OF OPERATION OF A MEMORY UNIT TO HANDLE OPERATION REQUESTS

This application is the U.S. national phase of International Application No. PCT/GB2017/051861 filed Jun. 26, 2017 which designated the U.S. and claims priority to GB Patent Application No. 1614195.4 filed Aug. 19, 2016, the entire contents of each of which are hereby incorporated by reference.

The present disclosure relates to memory systems. More particularly, the present disclosure relates to the handling of operation requests within memory systems.

In traditional systems it is known to transfer data from the memory system to a processor, so that processing operations can be performed on the data by the processor. In other systems, some processing circuitry may additionally be implemented at certain levels within the memory system, for example within one or more levels of cache, so that it is also possible to transfer a request to perform the operation to the data, and for the processing circuitry within a memory unit to then perform the operation. Such operations are known as far operations (also sometimes referred to as far atomic operations), and are used to reduce the movement of data in a system. Previously, far operations were limited to a few relatively simple operations such as arithmetic and logical operations, and hence implementing processing circuitry that could handle these operations at multiple levels in the memory system incurred little cost. The multiple levels of the memory system that could handle far operations (e.g. multiple levels of cache) are typically provided with the same processing capabilities, making the handling of far operations relatively straightforward. In particular, a request to perform a far operation may simply be propagated through the various levels of the memory system that support far operations until it reaches a memory unit which stores the data, at which point the operation may be performed. If the last level supporting far operations (e.g. a last level cache) is reached without the data being found, the data would then be retrieved from a further level of the memory system and processed at that last level.

However, with the development of advanced programming languages, there may be a desire to introduce more complex far operations. The introduction of complex far operations not only requires more complex processing circuitry to be provided at the memory units where the far operations will be performed, but also makes efficient handling of the far operations more complicated.

At least some examples of the present technique provide a memory unit comprising:
 a data storage to store data;
 an operation controller to receive operation requests issued by an upstream source;
 a downstream capabilities storage to store an indication of operations performable by at least one downstream memory unit; and
 processing circuitry to perform operations on data stored in the data storage under control of the operation controller;
 wherein, when an operation request to perform an operation on target data is received from the upstream source, the operation controller is arranged to determine when to control the processing circuitry to perform the operation and when to forward the operation to a downstream memory unit dependent on whether the target data is stored in the data storage and said indication of operations performable by at least one downstream memory unit.

At least some examples of the present technique provide a method comprising:
 storing data in a data storage;
 receiving operation requests issued by an upstream source;
 storing an indication of operations performable by at least one downstream memory unit; and
 providing processing circuitry to perform operations on data stored in the data storage; and
 wherein, when an operation request to perform an operation is received, the method further comprises:
 determining when to control the processing circuitry to perform the operation and when to forward the operation to a downstream memory unit in dependence on whether the target data is stored in the data storage and said indication of operations performable by at least one downstream memory unit.

At least some examples of the present technique provide a memory device comprising:
 data storage means for storing data;
 operation controller means for receiving operation requests issued by an upstream source;
 downstream capabilities storage means for storing an indication of operations performable by at least one downstream memory unit; and
 processing means to perform operations on data stored in the data storage means under control of the operation controller means;
 wherein, when an operation request to perform an operation on target data is received from the upstream source, the operation controller further for determining when to control the processing means to perform the operation and when to forward the operation to a downstream memory unit dependent on whether the target data is stored in the data storage means and said indication of operations performable by at least one downstream memory unit.

The present technique will be described further, by way of example only, with reference to embodiments thereof as illustrated in the accompanying drawings, in which.

Before discussing the embodiments with reference to the accompanying figures, the following description of embodiments is provided.

In accordance with the present technique, a memory unit arranged to handle far operations does not rely on memory units in the memory system having uniform processing capabilities when determining how to handle far operations. When seeking to provide support for handling relatively complex far operations, design constraints may lead to upstream sources and downstream memory units having different processing capabilities to those of the memory unit. For example, when the operations to be performed are relatively complex, it may not be economic to implement advanced processing circuitry capable of performing the complex operations at all memory units in a system. The memory unit according to the present technique comprises a downstream capabilities storage to store an indication of operations performable by at least one downstream memory unit, and an operation controller that that determines how to efficiently handle operation requests. Specifically, the operation controller accounts for both whether target data to be operated on is stored in a local data storage and the operations performable by at least one downstream memory unit, and on this basis the operation controller is arranged to either control its local processing circuitry to perform the operation on the target data, or forward the operation request to a downstream memory unit. By considering both where the data is stored, and the processing capabilities of downstream memory units, this allows for more efficient handling of operation requests, supporting configurations where the processing capabilities of individual memory units are not uniform, whilst reducing unnecessary routing overhead when handling the operation requests.

In some examples, when the memory unit determines that target data is stored locally in the data storage and the memory unit is capable of performing the desired processing operation, the operation controller is arranged to control the processing circuitry to perform the operation on the target data. This may occur regardless of the indication stored in the downstream capabilities storage, because if the operation can be performed at the memory unit then performing the operation, rather than forwarding the request, will typically be more efficient than passing the operation request on to a downstream memory unit.

In at least some examples, when it is determined that the target data is absent in the data storage, the operation controller is arranged to determine from the downstream capabilities register whether at least one downstream capabilities register is capable of performing the operation. Therefore, the operation controller can determine how to efficiently handle the operation request. That is, in a memory system where all memory units have uniform capabilities, it may be safe to assume that the operation can be performed downstream and to automatically forward the operation request on this basis. However, the present technique recognises that a uniform arrangement may not always be economic, and thus this consideration of downstream capabilities can improve efficiency.

In some examples, when the target data is absent in the data storage and the indication of operations performable by at least one downstream memory unit indicates that at least one downstream memory unit is capable of performing the operation, the operation controller is arranged to forward the operation request to a downstream memory unit. Since the downstream capabilities storage indicates that at least one downstream memory unit can perform the operation, the memory unit can merely forward the request on, knowing that it will be processed by one of the downstream memory units. This provides for a more efficient handling of the operation request, as it avoids the need for the current memory unit to seek to retrieve the data from a downstream memory unit so that it can perform the operation locally.

In some examples, when the target data is absent in the data storage and the indication of operations performable by at least one downstream memory unit indicates that all downstream memory units are incapable of performing the operation, the operation controller is arranged to transmit a read request for the target data to the downstream memory unit in order to retrieve the target data. The memory unit can then perform the operation on the target data. In this way, unnecessary forwarding of the operation request is avoided.

In at least some examples, the processing circuitry is arranged to be capable of performing the operation for any operation request received from the upstream source. That is, in this arrangement the memory unit will only receive operation requests for operations which can be performed by its local processing circuitry. Such a constraint can be achieved by ensuring that the operations performable by any given memory unit are the same as, or a strict subset of, the operations performable by upstream memory units, so that if an upstream source's record of what operations can be performed downstream indicates that the operation in question can be performed by at least one downstream memory unit, it will be performable by at least the next downstream memory unit that it propagates the request to.

In at least some examples, when it is determined that the target data is stored in the data storage, but the processing circuitry is incapable of performing the operation, the operation controller is arranged to both forward the operation request to the downstream memory unit and to control forwarding of the target data from the data storage to the downstream memory unit. As both the operation request and the target data are forwarded downstream, the operation can be performed when these are received by a downstream memory unit capable of performing the operation, even if that downstream memory unit did not previously store the data.

In at least some examples, the memory unit may be a preferable location for performing particular kinds of operations. In such instances, it may be desirable to perform all such operations at the memory unit even if other memory units may also be capable of performing the same operation. To achieve this, when the target data is absent in the data storage, the operation controller may be arranged to automatically forward a read request for the target data regardless of any indication stored in the downstream capabilities storage. Therefore, the target data can be retrieved, and the operation may performed by the local processing circuitry at the preferable location. For example, when the memory unit is a preferable location because it is particularly efficient at handling a certain type of operation, directing operation requests of that type to the memory unit improves efficiency.

In some examples, the downstream capabilities storage may be a software exposed storage element that is programmable to identify the indication of operations performable by at least one downstream memory unit. In this case, the downstream capabilities may be established statically by a programmer or designer that is aware of the downstream capabilities.

In some other examples, the memory unit may be arranged to dynamically determine downstream capabilities. Specifically, the operation controller may be arranged to trigger a contacted downstream memory unit to generate at least one capability indicator indicative of operations performable by at least one downstream memory unit. The capability indicator may be indicative of the operations performable exclusively by the contacted downstream memory unit, or may be indicative of the operations performable collectively by a plurality of downstream memory units. The downstream capabilities storage may then be populated based on the at least one capability indicator.

In some examples, when an indication of whether at least one downstream unit is capable of performing the operation indicated by the operation request is absent in the downstream capabilities storage, the operation controller is arranged to update the downstream capabilities register based on a capability indicator received from a downstream memory unit. The capability indicator may be received in response to the operation request as forwarded to the downstream memory unit. As previously described, the capability indicator can be arranged to indicate whether the operation can be performed by at least one downstream memory unit, thus allowing the operation controller to dynamically determine the downstream capabilities.

In some examples, the operation controller may be further arranged to forward a capability indicator received from any downstream memory units to the upstream source. In this way, the upstream source may also dynamically populate a further capabilities storage.

The capability indicator can take a variety of forms, but in some examples an operation performed acknowledgement signal and an operation not performed acknowledgement signal may be employed as the capability indicator. If, following forwarding of an operation request to a downstream memory unit, the memory unit subsequently receives an acknowledgement that the operation has been performed, this means that at least one downstream memory unit is capable of performing that operation. Conversely, if the memory unit receives a "not performed" acknowledgement signal, this indicates that none of the downstream memory units were capable of performing the operation. In both cases, the downstream capabilities storage can be updated accordingly.

In some examples, when the operation controller determines that the memory unit is a last memory unit in a hierarchical memory system (which in one embodiment means for the memory unit will contain the data), but it is determined that the processing circuitry is incapable of performing the operation, the operation controller is arranged to send a capability indicator to the upstream source indicating that the operation has not been performed. This hence provides a mechanism for enabling corrective action to be taken.

The operations that may be processed as far operations using the techniques of the described embodiments can take a variety of forms, but in at least some examples, the operation specified by the operation request comprises one of:
 a boolean arithmetic operation;
 an integer arithmetic operation;
 an integer SIMD operation;
 a floating point operation;
 a floating point SIMD operation.

Particular examples will now be described with reference to the Figures.

Figure 1:
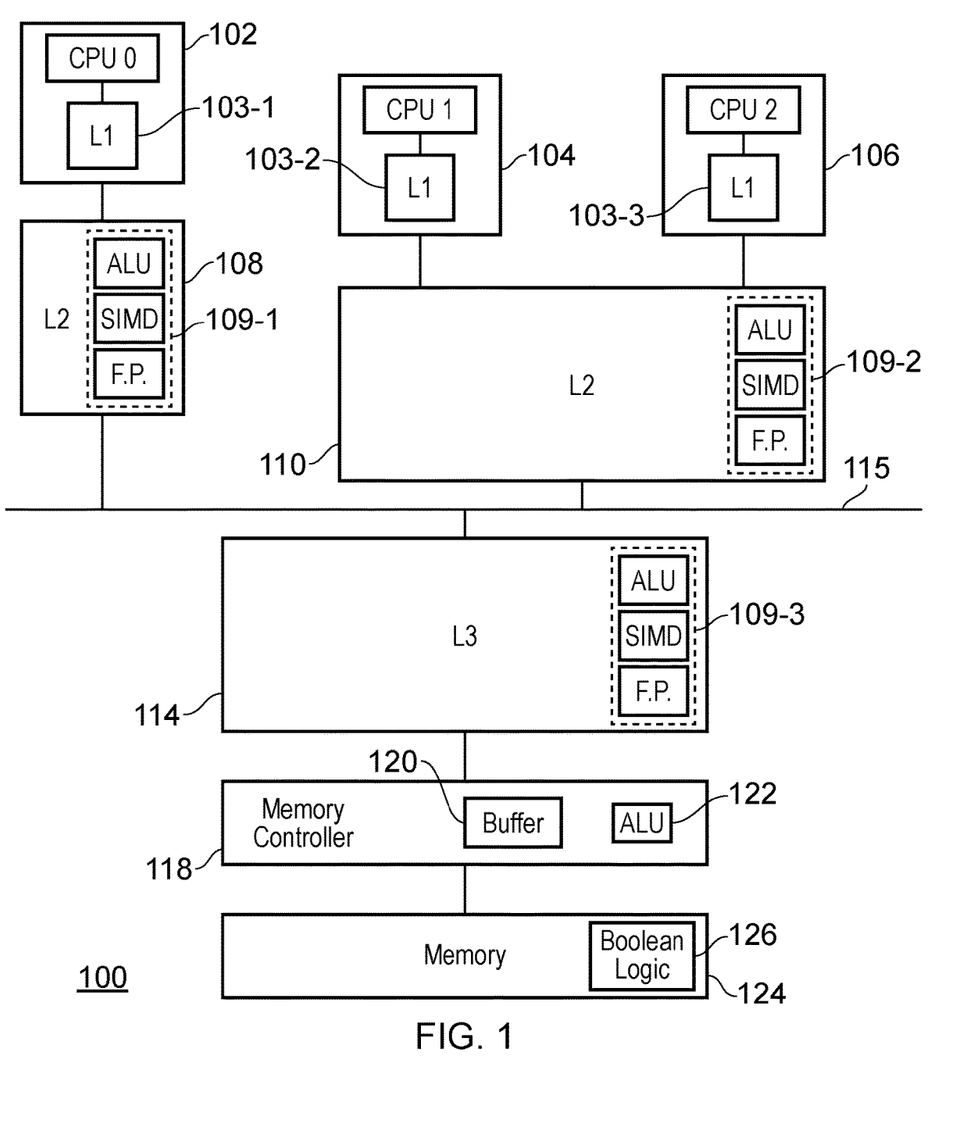
FIG. 1 schematically illustrates an example of a memory system in which the memory units have processing circuitry.

FIG. 1 shows one example of a system 100 comprising three processors CPU0, CPU1 and CPU 2 coupled to a multi-level memory system. The system 100 includes three top level processing blocks: 102, 104 and 106. Each of the processing blocks includes a CPU: CPU0, CPU1 and CPU2 respectively, and each of the CPUs has exclusive use of an associated L1 (level 1) cache 103-1, 103-2 and 103-3 forming a first level of the memory system. In addition to the L1 caches 103-1, 103-2 and 103-3, CPU0 also has exclusive use of L2 (level 2) cache 108, and CPU1 and CPU2 share an L2 cache 110. The CPUs are connected via an interconnect 115 and all have shared use of an L3 (level 3) cache 114. Likewise, the memory 124 is accessible by all the CPUs, and is accessed via memory controller 118. The memory controller includes a buffer 120 which may be used to temporarily store data that is scheduled to be written, or has recently been read, from the memory 124. Each one of the processing blocks 102, 104 and 106, the L2 and L3 caches 108, 110 and 114, the memory controller 118 and the memory 126 of the memory system has the capabilities to store and process data and may be thought of as a memory unit. The memory units form a hierarchical structure in which a request for data will be propagated from a CPU towards the memory 126, such that each stage of the memory hierarchy will be sequentially checked until that particular data is found. A memory unit may be referred to as 'upstream' when it is closer to the CPU level from a particular reference point, and 'downstream' when it closer to the memory 124 from that same particular reference point.

In the memory system of FIG. 1, each of the memory units includes processing circuitry. For example, the L2 cache 108 includes processing circuitry 109-1 having an arithmetic logic unit (ALU), circuitry for performing single instruction multiple data (SIMD) operations, and circuitry for performing floating point (FP) operations. In this example, L2 cache 110 and L3 cache 114 include the same processing circuitry as that of L2 cache 108, and are hence capable of performing the same processing operations. On the other hand, the memory controller 118 of the memory system 100 includes ALU 122 and is capable of performing arithmetic operations, but may not be capable of performing complex operations such as SIMD or floating point. Similarly, the memory 124 includes Boolean logic 126 and so is capable of performing Boolean operations, but may not be capable of performing other types of operations such as the more complex ALU operations performable by the memory controller 118. This arrangement where the caches have more advanced processing circuitry than the memory controller 118 and the memory 124 may be more economic to produce as processing circuitry for handling complex operations such as SIMD operations and FP operations can be expensive.

When a CPU is to perform an operation on data, it may retrieve that data from the memory unit that stores the data and perform the operation locally. However, as the memory units of the memory system each have some capacity to locally perform operations, in some cases it may be advantageous to instead transfer an operation request from the CPU to the memory unit that stores the data, and allow that memory unit to perform the operation. For example CPU0 may require a floating point operation to be carried out on data that is stored in the L3 cache 114. However, instead of retrieving the data from the L3 cache 114 and performing the floating point operation, CPU0 may instead issue an operation request identifying the data and the operation to be performed. Upon receipt of this operation request, the L3 cache 114 can itself perform the floating point operation on the data using processing circuitry 109-3. Such operations are referred to herein as far operations (also known as far atomic operations), due to such an operation being processed where the data resides rather than retrieving the data into the CPU to allow the operation to be performed locally. The use of far operations can significantly reduce data traffic within the memory system.

Figure 2:
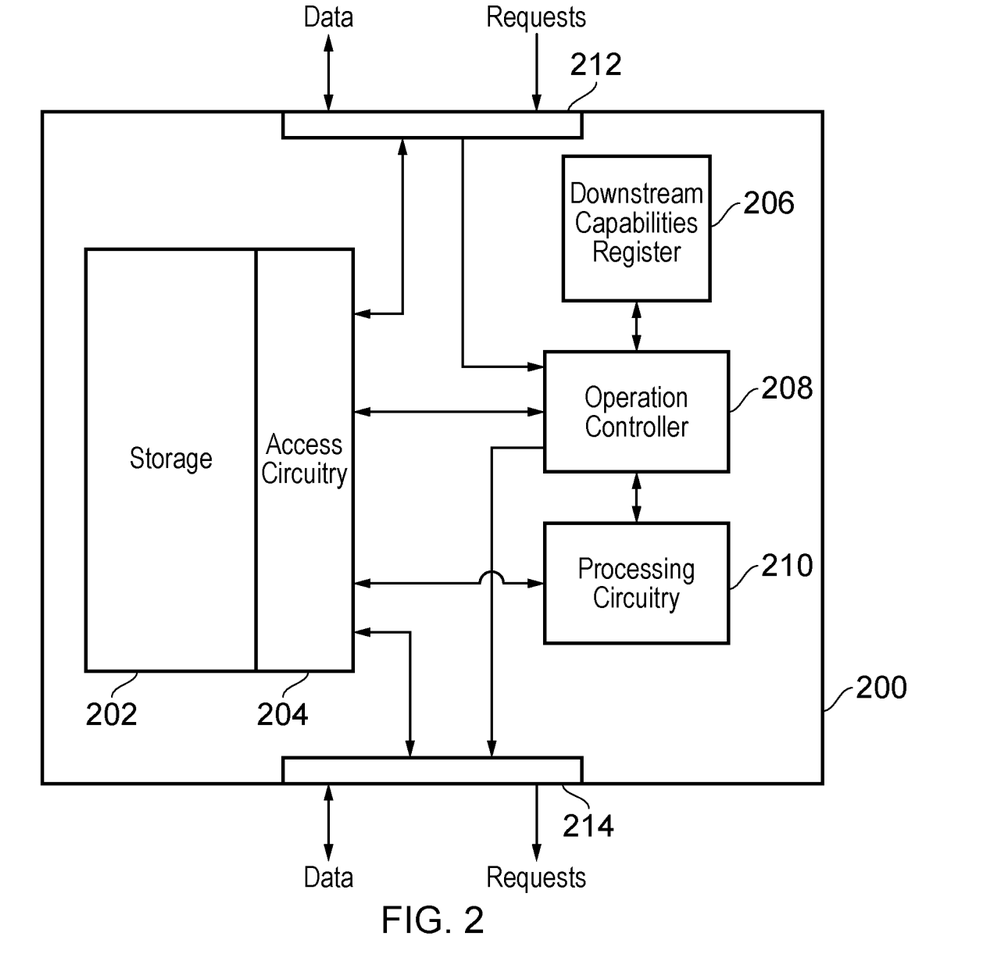
FIG. 2 schematically illustrates an example of a memory unit according to an embodiment of the present technique.

FIG. 2 shows an example of the configuration of a memory unit 200. The memory unit comprises a storage 202 for storing data, access circuitry 204 for accessing the storage 202, a downstream capabilities register 206, an operations controller 208, and processing circuitry 210. Data and requests may be received from an upstream memory unit via interface 212, and transmitted to downstream memory units via interface 214. Data may also be received from a downstream memory unit and transmitted upstream as indicated by the bi-directional data paths associated with interface 212 and interface 214.

The memory unit 200 is arranged to receive typical read/write requests from an upstream request source. Such requests are routed to the access circuitry 204 which performs the respective read or write on the data in the storage 202.

The memory unit 200 is also arranged to respond to far operation requests (simply referred to herein as operation requests) received from an upstream request source. Upon receipt of an operation request to perform an operation on target data, the operation controller 208 is arranged to determine if the target data is present in the storage 202, and whether any downstream memory units are capable of performing the operation. On the basis of these criteria, the operation controller 208 will either forward the operation request to a downstream memory unit via interface 214, or control the processing circuitry 210 to perform the operation on the target data. The indication of whether any downstream memory units are capable of performing the operation is stored in the downstream capabilities register 206. Each of the memory units 102, 104, 106, 108, 110, 114, 118,124 shown in FIG. 1 may generally be arranged as shown in FIG. 2. Considering the example of the processing blocks 102, 104, 106, the CPU effectively forms the processing circuitry 210.

Figure 3:
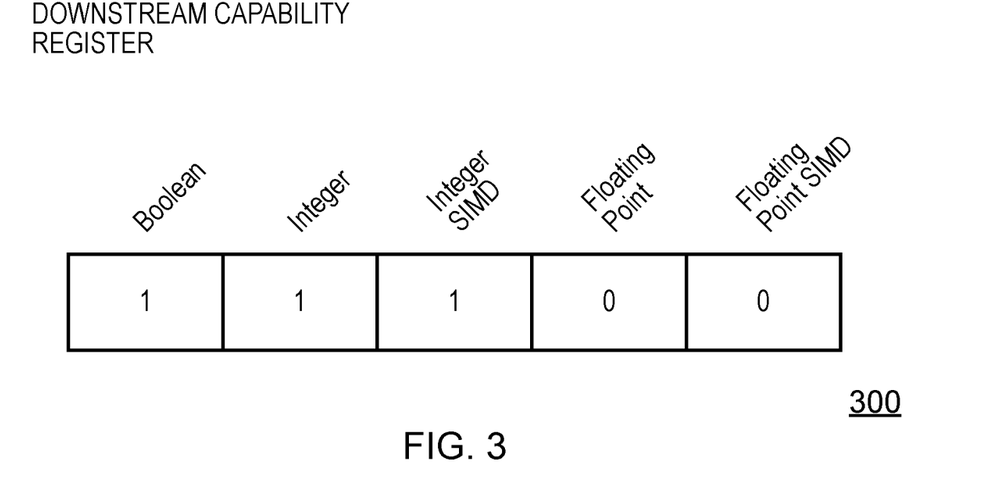
FIG. 3 illustrates an example of a downstream capabilities register that stores an indication of the operations performable by downstream memory units in a memory system.

FIG. 3 shows a logical representation 300 of the downstream capabilities register 206. Here, a '1' indicates that at least one downstream memory unit is capable of performing an operation, whereas a '0' indicates that none of the downstream memory units have the capabilities for performing the operation. Therefore, in the example of FIG. 3, at least one downstream memory unit is capable of perform Boolean operations, integer operations and integer SIMD operations. However, none of the downstream memory units are capable of performing floating point operations or floating point SIMD operations. The example of FIG. 3 is a simple downstream capabilities register where only a 1-bit representation is provided for each type of operation. However, it will be appreciated that other representations are also possible, such as a 2-bit representation indicative of one of 'yes', 'no' or 'don't know'. The downstream capabilities register 206 may be software exposed, and thus programmable to correspond to the downstream capabilities of the downstream memory units in any design, or the downstream capabilities register may be arranged to be populated dynamically.

In some examples each of the memory units of a memory system such as that of FIG. 1 may be provided with a downstream capabilities register that indicates the capabilities of downstream memory units. Furthermore, as can be seen from FIG. 1, the capabilities of each memory unit of the memory system in that example is either equal to, or a subset of, the capabilities of the memory unit directly upstream. Therefore, operation requests will only be dispatched to an adjacent downstream memory unit when it is known that that adjacent downstream memory unit is capable of performing the desired operation.

Figure 4:
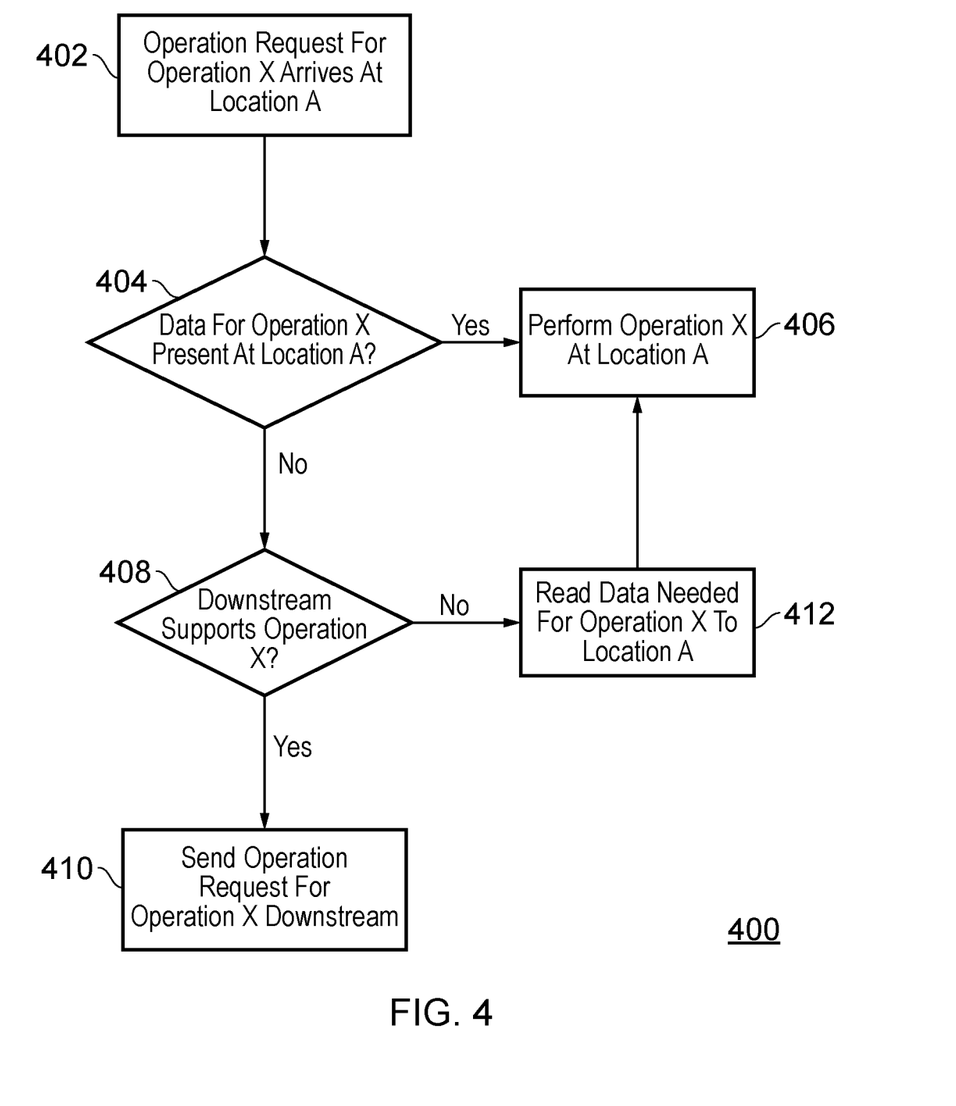
FIG. 4 illustrates one example of a method for responding to an operation request.

FIG. 4 illustrates one example of a method 400 for responding to an operation request that may be used in association with such an arrangement. In one embodiment, this method is employed within each of the memory units. In step 402 an operation request for operation X is received at location A, location A being one of the memory units within the hierarchical memory system. The memory unit first determines if it has the data required for performing operation X in step 404. When the data is present, the memory unit performs operation X on the data locally as shown in step 406. However, if the data is not present, then the memory unit determines whether at least one downstream memory unit is capable of performing operation X as shown in step 408. On the basis of this determination the memory unit then either forwards operation X downstream as shown in step 410, or retrieves the data required for operation X in step 412 and performs operation X locally at step 406. It is evident from the method 400 that an operation request for operation X will be only be propagated downstream when it is known that at least one downstream memory unit is capable of performing operation X.

Figure 5:
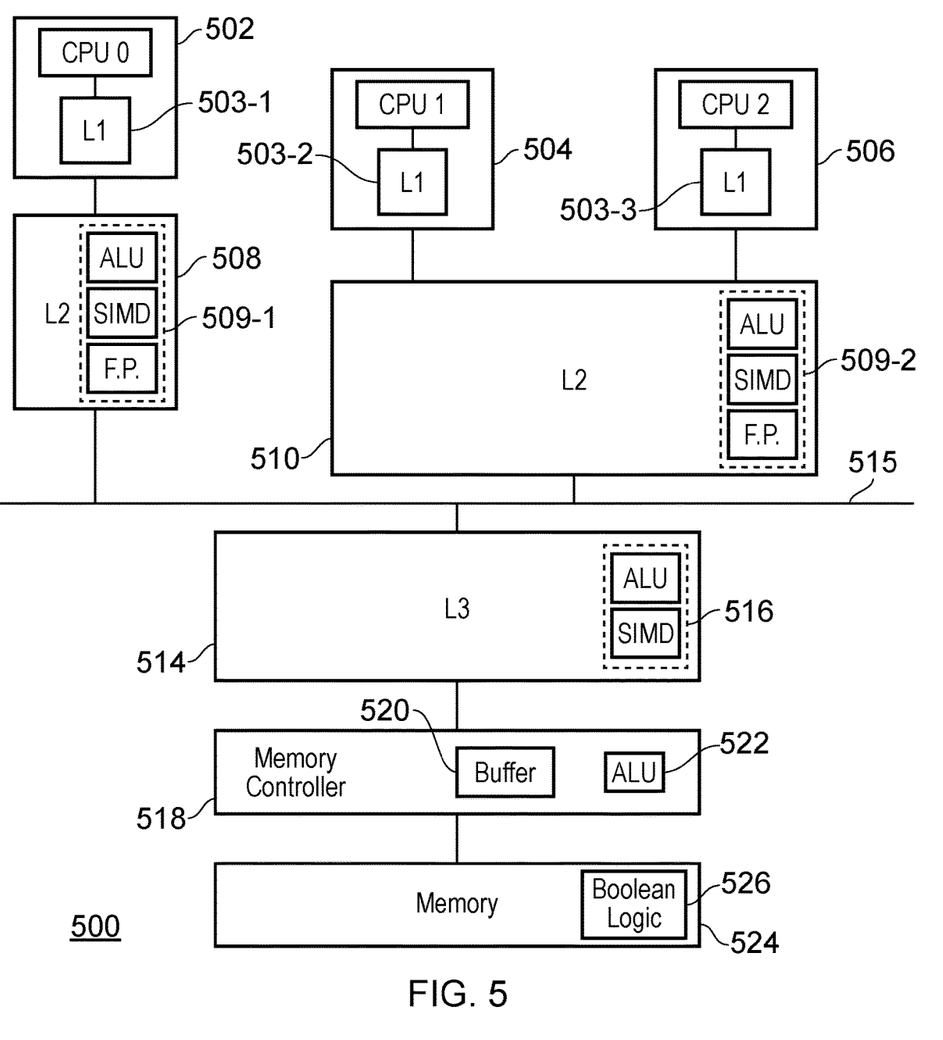
FIG. 5 schematically illustrates another example of a memory system in which the operations performable by a given memory unit are a strict subset of the operations performable by upstream memory units.

FIG. 5 shows another example of a system 500. The system 500 is similar to that shown in FIG. 1, other than the processing circuitry associated with each memory unit. In the system 500, the processing circuitry of each memory unit is a strict subset of the processing circuitry of the memory unit upstream to it. In other words, the operations performable at each stage subsequent from a CPU are monotonic. The system 500 has similar characteristics to that of FIG. 1 in that it can be assumed that if a request for a particular operation has been received, then the memory unit is capable of performing that operation. Therefore, in the memory system of FIG. 5 cost reductions can be made in terms of processing circuitry implemented at the memory units without adding further complications to the method of FIG. 4 for example.

Figure 6:
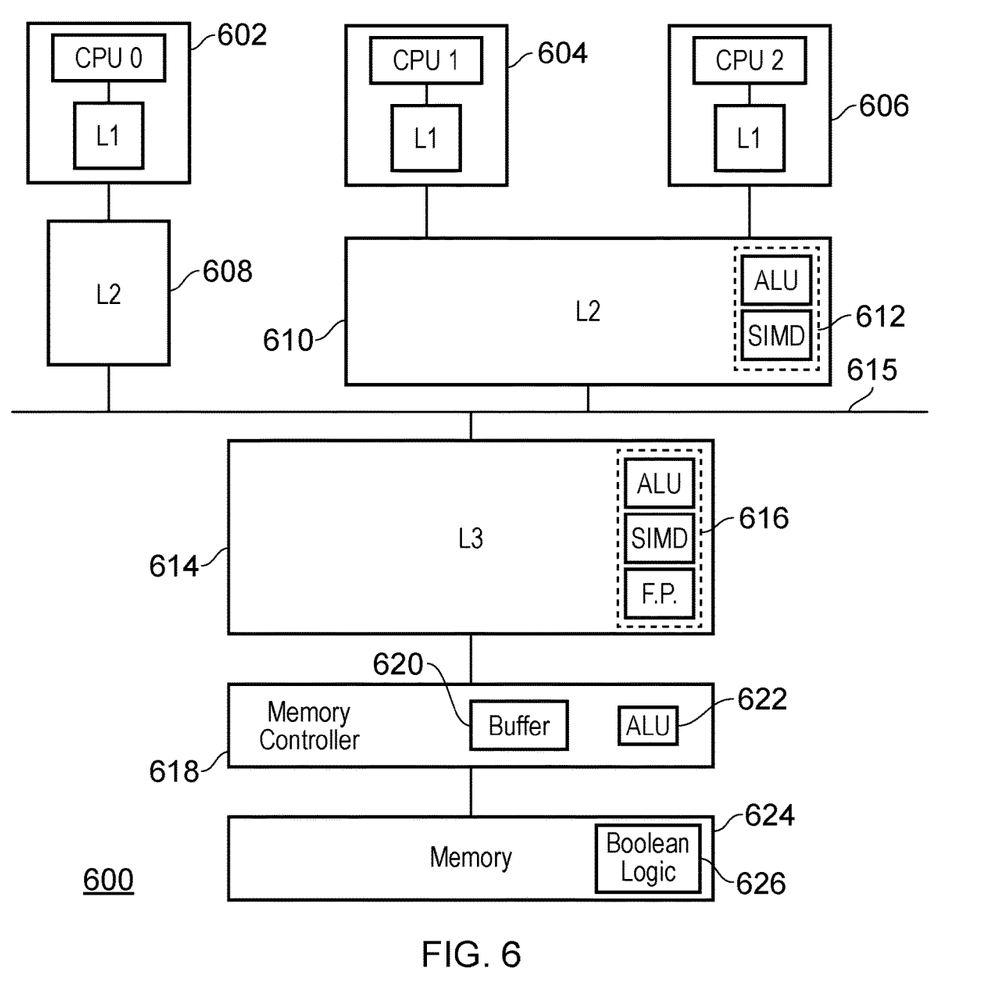
FIG. 6 schematically illustrates another example of a memory system in which the memory units have varying capabilities and there is less correlation between the operations performable by a given memory unit and the position of that memory unit in the memory system.

FIG. 6 shows another example of a memory system 600. In the system 600 the memory units have varying capabilities, and there is less correlation between the operations performable by a given memory unit and that memory unit's particular position in the memory system. For example, the L2 cache 608 does not include any processing circuitry and thus cannot perform any operations. On the other hand, L2 cache 610 is arranged with processing circuitry 612 which is capable of performing arithmetic operations and SIMD operations. The L3 cache 614 is provided with processing circuitry 616 having more functionality than either of the L2 caches and is capable of performing floating point operations as well as arithmetic operations and SIMD operations. The memory controller 618 includes a buffer 620 and an ALU 622 for performing arithmetic operations, and the memory 624 includes Boolean logic 626 for performing Boolean operations.

In the system 600, the situation where a memory unit has data that is the target of an operation request, but does not have the capabilities to perform the operation, may arise. For example, if CPU1 issues an operation request for performing a floating point operation on data stored in the L2 cache 612, then despite having the target data, the L2 cache 612 would be unable to respond to the request. Therefore, in the system 600 the memory units may be further arranged to forward operation requests and data downstream in response to being incapable of responding to an operation request. Thus the L2 cache 610 would forward the operation request as well as the target data to the L3 cache 614. Then the L3 cache 614 would then be able to perform the operation on the target data using processing circuitry 616.

Figure 7:
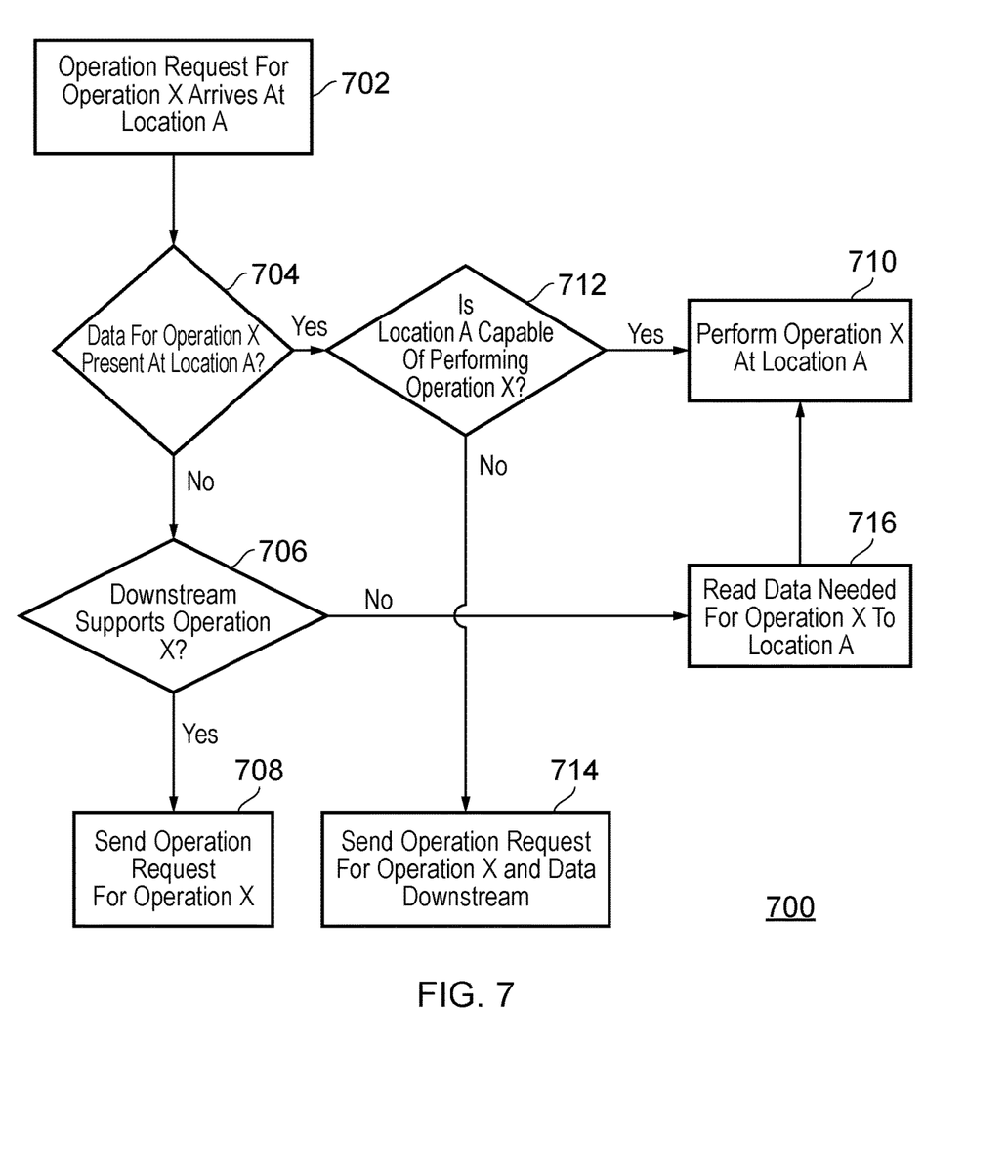
FIG. 7 illustrates a method for responding to an operation request in which the receiving memory unit may not be capable of performing the operation.

FIG. 7 illustrates one example of a method 700 that may be used in association with a memory system such as that of FIG. 6, this method being performed at each of the memory units. First, at step 702, an operation request for operation X arrives at location A. Then at step 704, it is determined whether the data for operation X is present at location A. If at step 704 it is determined that the data for operation X is present at location A, it also needs to be confirmed that location A is capable of performing operation X, as shown in step 712. If location A is capable of performing operation X, then at step 710 operation X is performed at location A. However, if location A is not capable of performing operation X, then the method proceeds to step 714, where the operation request for operation X as well as the data for operation X is forwarded to a downstream memory unit. Alternatively, if the data is not present, the method 700 is similar to that shown in FIG. 4, and at step 706 it is determined whether one of the downstream memory units can perform operation X. If one of the downstream memory units is capable of performing operation X, then the operation request for operation X is forwarded downstream in step 708. Alternatively, if step 706 determines that no downstream memory units are capable of performing operation X, then in step 716 the data needed for operation X is retrieved to location A, and in step 710, operation X is performed at location A.

Having determined that the data is not present at location A in step 704, and none of the downstream memory units are capable of performing operation X in step 706, it can be assumed that location A is capable of performing the operation. Therefore an additional determination step such as that of step 712 need not be included following this chain of events. This is because although the capabilities of any given number of memory units may seem arbitrary, an upstream request source is still able to determine the operations performed collectively by a group of memory units downstream, and will only issue operations requests on this basis. Therefore, if it is determined that the data for operation X is not present and none of the downstream memory units are capable of performing operation X, then by process of elimination location A will in this embodiment be capable of performing operation X.

Figure 8:
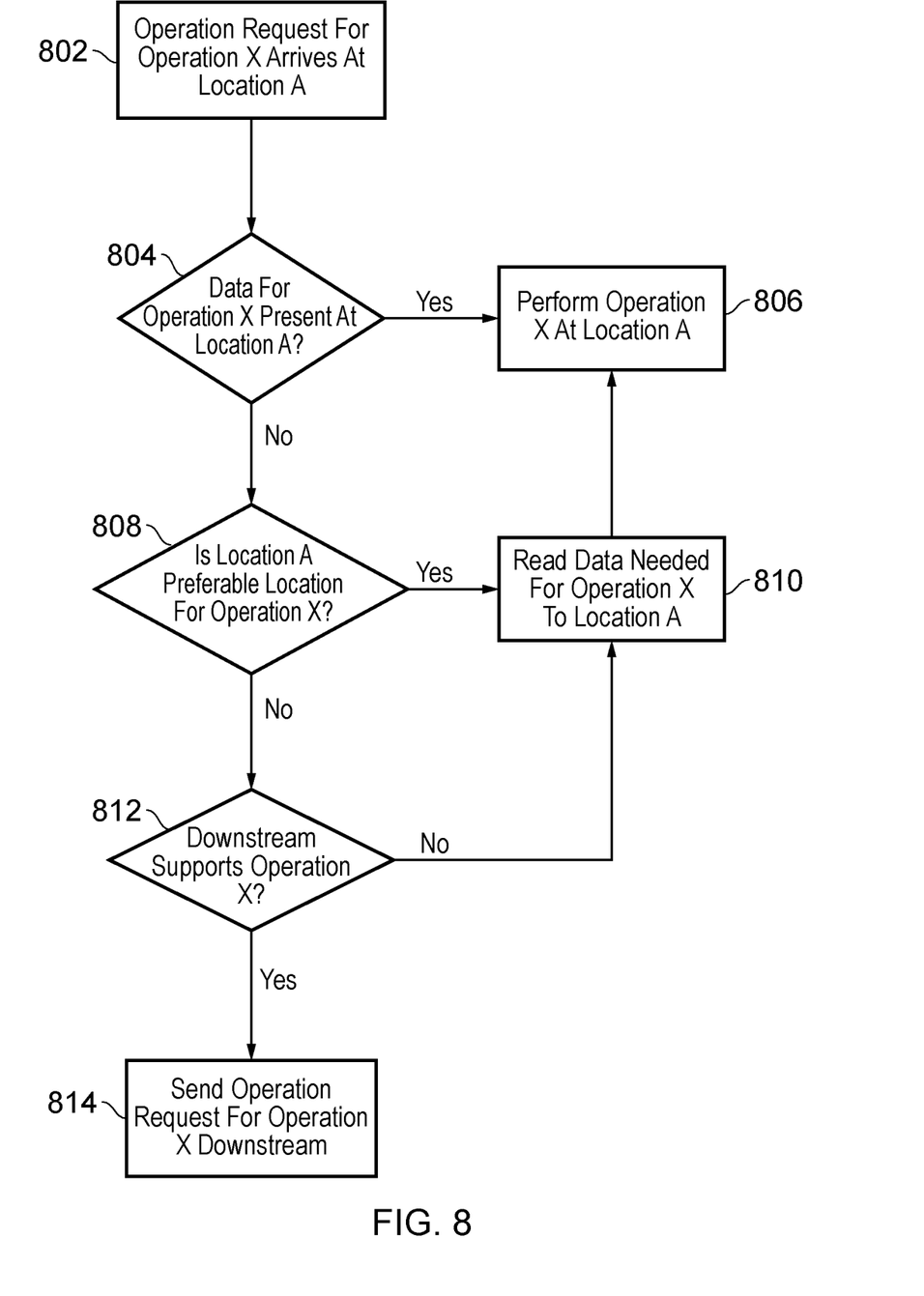
FIG. 8 illustrates a method for responding to an operation request in which a memory unit may be a preferable location for responding to such operation requests.

In some memory systems a given memory unit may be arranged with processing circuitry that is particularly efficient for performing one or more certain operations. For example, in a system 100 such as that of FIG. 1, the L2 cache 108 may be arranged to perform SIMD operations with greater efficiency than the other memory units of the memory system. In such cases, the L2 cache 108 may be arranged to perform SIMD operations in response to SIMD operation requests regardless of where the data is stored and despite the L3 cache 109-3 also being capable of performing SIMD operations. FIG. 8 illustrates a method 800 for operating a memory system according to such an arrangement, this method being performed at each of the memory units. At step 802 an operation request for operation X arrives at location A. Then at step 804, it is determined whether the data for operation X is present. If the data is present, operation X is performed at location A as shown by step 806. However, if the data for operation X is not present, then at step 808 it is determined whether location A is the preferable location for performing operation X. When location A is the preferable location for performing X, the method proceeds to step 810 where the data needed for operation X is retrieved to location A, and at step 806, operation X is performed at location A. This process effectively overrides the previously described process of checking whether a downstream memory unit is capable of performing the operation and forwarding the operation request downstream on this basis when location A does not have the data. Therefore, when a memory system includes a memory unit that is a preferable location for performing certain operations, this method increases the number of those operations that are performed at that memory unit. However, if location A is not the preferable location for performing operation X, then at step 812 it is determined whether a memory unit downstream is capable of performing operation X. When this is the case, then at step 814 the operation request is forwarded to a downstream memory unit. Alternatively, if none of the downstream memory units are capable of performing operation X, then the data needed for operation X is retrieved to location A in step 810, and then operation X is performed at location A at step 806.

Figure 9:
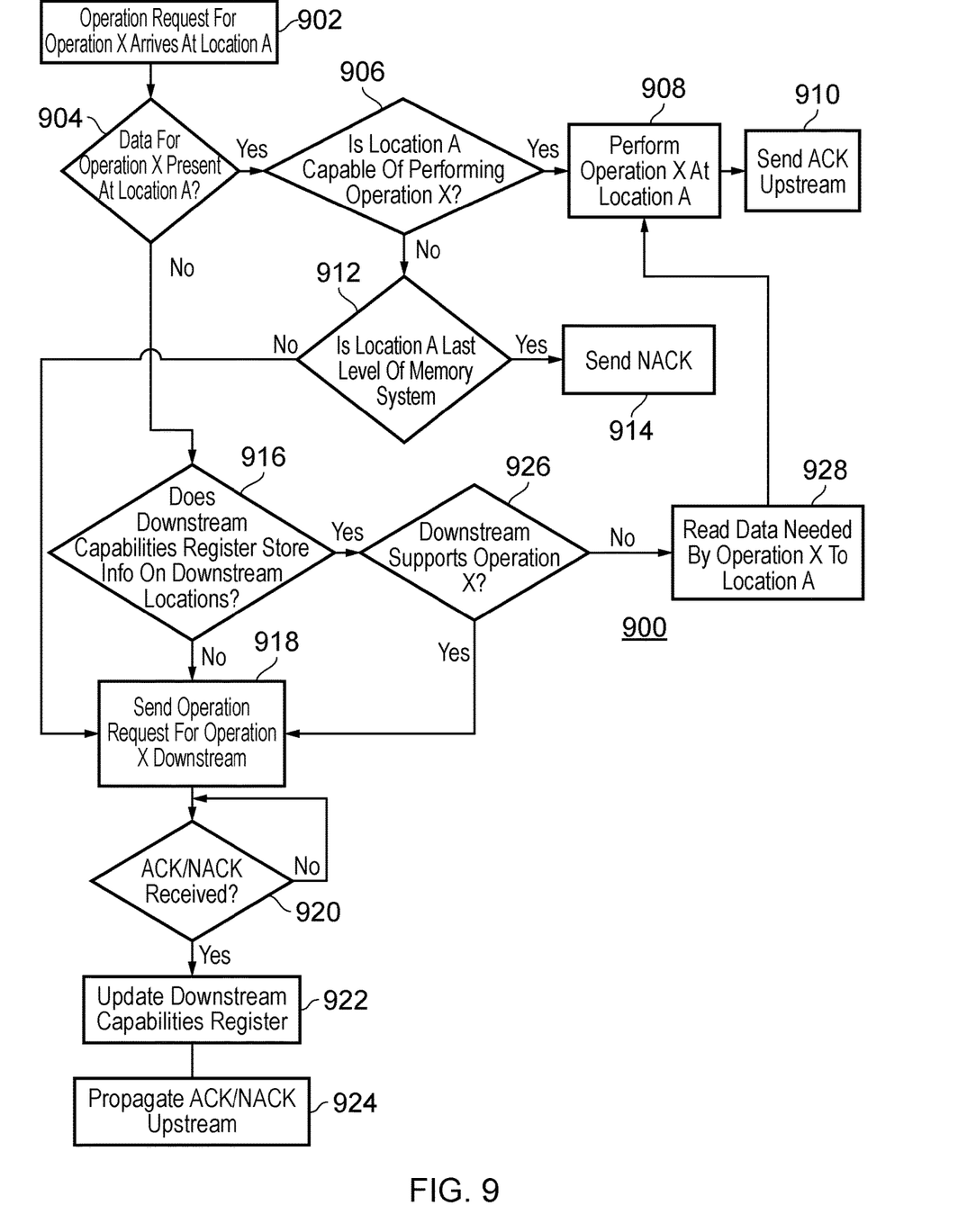
FIG. 9 illustrates a method for dynamically populating a downstream capabilities register.

In some examples the downstream capabilities register may not initially store an indication of the operations performable by the downstream memory units. In such cases, the downstream capabilities register may be populated dynamically based on indications transmitted between the memory units of the memory system. FIG. 9 shows an example of a method 900 for dynamically populating the downstream capabilities register, this method being performed at each of the memory units. At step 902, an operation request for operation X arrives at location A, and at step 904 it is determined whether the data for operation X is present at location A. If the data is present, and it is determined that location A is capable of performing operation X at step 906, then operation X is performed at location A in step 908. Following this, the additional step 910 includes transmitting an 'ACK' upstream. Alternatively, if location A is not capable at performing operation X, and at step 912 it is determined that location A is also the last level of the memory system, such as the memory 124 of the system 100 of FIG. 1, then the process proceeds to step 914 where a 'NACK' is transmitted upstream (indicating that the operation has not been performed). The transmission of an 'ACK' or an 'NACK' upstream provides a basis for any upstream memory units to arrange their downstream capabilities registers to indicate whether operation X is performable downstream.

When the data for operation X is not present at location A, then at step 916 it is checked whether the downstream capabilities register of location A stores information as to whether the type of operation of which operation X is an example is performable by at least one downstream location. If the downstream capabilities register of location A does not store any such information, or if at step 912 it is determined that location A is not the last level of the memory system, then at step 918 the operation request for operation X is forwarded downstream. Then at step 920, the process awaits receipt of an 'ACK' or an 'NACK' from a downstream memory unit indicating whether or not operation X can be performed. At step 922 the downstream capabilities register of location A is updated on the basis of the received 'ACK' or 'NACK'. In addition, the 'ACK' or 'NACK' is also propagated upstream in step 924 so that other memory units may also update their downstream capabilities register on this basis.

Alternatively, if the downstream capabilities register does store information relating to the downstream locations in step 916, and at step 926 it is determined from this information that none of the downstream memory units are capable of performing operation X, then at step 928 the data is retrieved to location A. Subsequently at step 908 operation X is performed at location A and at step 910 an 'ACK' is transmitted upstream. If at step 926 it is determined that at least one downstream location supports performance of operation X, then the process proceeds to step 918.

As the downstream capabilities registers of the various memory units are populated based on the Ack/NAck information received, the memory units can then take further additional steps if needed with regards to the current operation request that has been used as the trigger for generation of the Ack/NAck information. For example, if a memory unit determines that none of the downstream memory units are capable of performing a particular operation, then steps could be taken to cause operation X to be performed at a memory unit that is capable of performing the operation, and at that point the required data may first be obtained from a downstream memory location if needed.

In one embodiment, the process of FIG. 9 can be altered so that the data required to perform an operation may be propagated upstream with the NAck signal issued by a final level memory unit, until a memory unit is reached where the operation can be performed. In particular, if at step 912 it is determined that the memory unit is the last level of the memory system, then when the NAck signal is sent at step 914, that last level memory unit may also propagate the data required for the operation back to the upstream memory unit along with the NAck signal. The upstream memory unit will be waiting at step 920 for the Ack/NAck signal, and when the NAck signal is received, it will not only update its downstream capabilities register at step 922 to identify that there are no downstream memory units capable of performing the operation, but will also evaluate whether it is capable of performing the operation. If it can perform the operation, then it will perform the operation locally using the data that has been returned from the last level memory unit, and thereafter will propagate an Ack signal upstream. Alternatively, if it cannot perform the operation, it will propagate the Nack signal upstream along with the data. It will be appreciated that the next upstream memory unit can then also perform the above modified sequence of steps 920, 922, 924, which will result at some point in the operation being performed by the first upstream memory that is capable of performing that operation.

From the above described embodiments, it will be appreciated that such embodiments allow for far operations to be executed at a suitable location within the memory system, taking into account not only where the data resides, but also the complexity of the far operation and the capabilities of the processing circuitry provided at various memory locations within the memory system. This provides a very flexible mechanism for performance of far operations, allowing different locations within the memory system to be provided with different processing capabilities whilst still ensuring efficient processing of far operation requests.

By such an approach far operations can be performed not only on-chip within the various levels of cache, but also within the memory controller or within the off-chip memory itself, but with the ability to provide different levels of the memory system with different processing capabilities for performing far operations, thereby providing a great deal of flexibility.

In accordance with the described embodiments, the far operation requests have an encoding that expresses the complexity, and thus requirements, of the operation, and this is then coupled with complexity-aware decisions made throughout the memory system, where a given memory unit not only looks at whether the required data resides locally within that memory unit, but also considers the capabilities of its local processing circuitry, and the capabilities of downstream memory units, when deciding where the operation should be handled.

There are various mechanisms that may be used to encode the capabilities and complexity of the operation. For example, one such encoding may merely involve classification of operation families, communicated through the bus fabric as part of the message header, for example: boolean arithmetic, integer ALU, integer SIMD, floating-point and floating-point SIMD.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative examples of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A memory unit for use within a system comprising at least one processor, the memory unit comprising:
    a data storage to store data;
    an operation controller to receive operation requests issued by an upstream source, wherein the upstream source is either the at least one processor or is positioned between the at least one processor and the memory unit;
    a downstream capabilities storage to store an indication of types of operations performable by at least one downstream memory unit, wherein the memory unit is positioned between the at least one processor and the at least one downstream memory unit; and
    processing circuitry to perform operations on data stored in the data storage under control of the operation controller;
    wherein, when an operation request to perform an operation on target data is received from the upstream source, the operation controller is arranged to determine when to control the processing circuitry to perform the operation and the operation controller is arranged to determine when to forward the operation to a next downstream memory unit dependent on whether the target data is stored in the data storage and said indication of types of operations performable by at least one downstream memory unit.

2. The memory unit according to claim 1, wherein in response to the operation request, when it is determined that the target data is stored in the data storage and the processing circuitry is capable of performing the operation, the operation controller is arranged to control said processing circuitry to perform the operation on the target data.

3. The memory unit according to claim 1, wherein in response to the operation request, when it is determined that the target data is absent in the data storage, the operation controller is arranged to determine from said indication of types of operations performable by at least one downstream memory unit whether at least one downstream memory unit is capable of performing the operation.

4. The memory unit according to claim 3, wherein when said indication indicates that at least one downstream memory unit is capable of performing the operation, the operation controller is arranged to forward the operation request to the next downstream memory unit.

5. The memory unit according to claim 3, wherein when said indication indicates that all downstream memory units are incapable of performing the operation, the operation controller is arranged to send a read request for the target data to the next downstream memory unit in order to retrieve the target data, whereupon the operation controller is arranged to control said processing circuitry to perform the operation on the target data.

6. The memory unit according to claim 1, wherein the processing circuitry is arranged to be capable of performing the operation for any operation request received from the upstream source.

7. The memory unit according to claim 1, wherein when it is determined that the target data is stored in the data storage and the processing circuitry is incapable of performing the operation, the operation controller is arranged to forward the operation request to the next downstream memory unit and to control forwarding of the target data from the data storage to the next downstream memory unit.

8. The memory unit according to claim 1, wherein the operation controller is arranged to further determine when the processing circuitry is a preferable destination for responding to the operation request, and when the processing circuitry is a preferable destination for responding to the operation request and the target data is absent in the data storage, the operation controller is arranged to forward a read request for the target data to the next downstream memory unit irrespective of the indication of types of operations performable in at least one downstream memory unit stored in the downstream capabilities storage.

9. The memory unit according to claim 1, wherein the downstream capabilities storage comprises a software exposed programmable storage element that is programmed to identify said indication of types of operations performable by at least one downstream memory unit.

10. The memory unit according to claim 1, wherein the operation controller is arranged to trigger the next downstream memory unit to generate at least one capability indicator indicative of types of operations performable by at least one downstream memory unit, and the downstream capabilities storage is populated dynamically on the basis of the at least one capability indicator received from the next downstream memory unit.

11. The memory unit according to claim 10, wherein when an indication of whether at least one downstream memory unit is capable of performing the operation indicated by the operation request is absent in the downstream capabilities storage, the operation controller is arranged to forward the operation request to the next downstream memory unit, and the operation controller is arranged to update the downstream capabilities register in dependence on a capability indicator subsequently received from the next downstream memory unit in reply to the operation request, the capability indicator indicating whether the operation can be performed by at least one downstream memory unit.

12. The memory unit according to claim 11, wherein the operation controller is further arranged to forward said capability indicator to the upstream source.

13. The memory unit according to claim 10, wherein each capability indicator comprises one of an operation performed acknowledgement signal and an operation not performed acknowledgement signal.

14. The memory unit according to claim 1, wherein when the operation controller determines that the memory unit is a last memory unit in a hierarchical memory system, and it is determined that the processing circuitry is incapable of performing the operation, the operation controller is arranged to send a capability indicator to the upstream source indicating that the operation has not been performed.

15. The memory unit according to claim 1, wherein the operation specified by the operation request comprises one of:
   a boolean arithmetic operation;
   an integer arithmetic operation;
   an integer SIMD operation;
   a floating point operation;
   a floating point SIMD operation.

16. A method of operating a memory unit within a system comprising at least one processor, the method comprising:
   storing data in a data storage;
   receiving operation requests issued by an upstream source, wherein the upstream source is eitherthe at least one processor or is positioned between the at least one processor and the memory unit;
   storing an indication of types of operations performable by at least one downstream memory unit, wherein the memory unit is positioned between the at least one processor and the at least one downstream memory unit; and
   providing processing circuitry to perform operations on data stored in the data storage; and
   wherein, when an operation request to perform an operation is received, the method further comprises:
   determining when to control the processing circuitry to perform the operation and determining when to forward the operation to a next downstream memory unit in dependence on whetherthe target data is stored in the data storage and said indication of types of operations performable by at least one downstream memory unit.

17. A memory device for use within a system comprising at least one processor, the memory device comprising:
   data storage means for storing data;
   operation controller meansfor receiving operation requests issued by an upstream source, wherein the upstream source is eitherthe at least one processor or is positioned between the at least one processor and the memory device;
   downstream capabilities storage meansfor storing an indication of types of operations performable by at least one downstream memory unit, wherein the memory device is positioned between the at least one processor and the at least one downstream memory unit; and
   processing means to perform operations on data stored in the data storage means under control of the operation controller means;
   wherein, when an operation request to perform an operation on target data is received from the upstream source, the operation controller means is arranged further to determine when to control the processing means to perform the operation and the operation controller means is arranged to determine when to forward the operation to a next downstream memory unit dependent on whether the target data is stored in the data storage means and said indication of types of operations performable by at least one downstream memory unit.

* * * * *